（12）United States Patent
Pisklak et al.

(10) Patent No.: US 11,098,234 B2
(45) Date of Patent: Aug. 24, 2021

(54) AGGLOMERATED ZEOLITE CATALYST FOR SPACERS AND EFFICIENCY FLUIDS

(71) Applicant: Halliburton Energy Services, Inc., Houston, TX (US)

(72) Inventors: Thomas Jason Pisklak, Cypress, TX (US); Juan Pablo Stacey, Quito (EC); James Robert Benkley, Duncan, OK (US); Claudia Carmen Pineda, Houston, TX (US); Ronnie Glen Morgan, Waurika, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/561,975

(22) Filed: Sep. 5, 2019

(65) Prior Publication Data

US 2021/0071061 A1 Mar. 11, 2021

(51) Int. Cl.
*C09K 8/40* (2006.01)
*E21B 33/14* (2006.01)
*C09K 8/504* (2006.01)
*C09K 8/50* (2006.01)

(52) U.S. Cl.
CPC ............... *C09K 8/40* (2013.01); *C09K 8/501* (2013.01); *C09K 8/5045* (2013.01); *E21B 33/14* (2013.01)

(58) Field of Classification Search
CPC . C09K 8/40; C09K 8/467; C09K 8/46; C09K 8/424; C04B 22/064; C04B 14/047; E21B 33/13; E21B 49/08; E21B 21/002; E21B 41/0092; E21B 7/18
See application file for complete search history.

(56) References Cited

U.S. PATENT DOCUMENTS

| | | | |
|---|---|---|---|
| 7,544,640 B2 | 6/2009 | Luke et al. | |
| 8,522,873 B2 | 9/2013 | Benkley et al. | |
| 2005/0072599 A1* | 4/2005 | Luke | C09K 8/467 175/66 |
| 2013/0112405 A1* | 5/2013 | Chatterji | C04B 28/04 166/250.01 |
| 2014/0000893 A1 | 1/2014 | Lewis et al. | |
| 2014/0034313 A1* | 2/2014 | Pisklak | C04B 28/18 166/292 |

(Continued)

FOREIGN PATENT DOCUMENTS

JP 4433795 B2 * 3/2010 ............. B01J 21/08

OTHER PUBLICATIONS

International Search Report and Written Opinion for Application No. PCT/US2019/049789, dated Jun. 4, 2020.

(Continued)

*Primary Examiner* — Zakiya W Bates
(74) *Attorney, Agent, or Firm* — Thomas Rooney; C. Tumey Law Group PLLC

(57) ABSTRACT

A method may include: providing a spacer fluid comprising water and an agglomerated zeolite catalyst; and displacing a drilling fluid in a wellbore using the spacer fluid. The agglomerated zeolite catalyst may be a spent agglomerated zeolite catalyst and may include a matrix, a filler, a binder, and zeolite crystals. The zeolite crystals may be selected from the group consisting of type x, type y, ultra-stable type y, ZSM-5, SAPO-11, silicalite-1, mordenite, ferrierite, beta, and combinations thereof.

17 Claims, 4 Drawing Sheets

(56) References Cited

U.S. PATENT DOCUMENTS

| | | | |
|---|---|---|---|
| 2014/0134308 A1* | 5/2014 | Peterson | A23K 50/10 |
| | | | 426/271 |
| 2014/0323361 A1 | 10/2014 | Livanec et al. | |
| 2015/0190794 A1 | 7/2015 | Karthikeyani et al. | |
| 2015/0315875 A1* | 11/2015 | Chatterji | C04B 28/02 |
| | | | 166/285 |
| 2015/0322327 A1 | 11/2015 | Chatterji et al. | |

OTHER PUBLICATIONS

Chen, H.-L., Tseng, Y.-S., & Hsu, K.-C. (2004). Spent FCC catalyst as a pozzolanic material for high-performance mortars. Cement and Concrete Composites, 26(6), 657-664.

\* cited by examiner

AGGLOMERATED ZEOLITE CATALYST FOR SPACERS AND EFFICIENCY FLUIDS

BACKGROUND

In cementing operations, such as well construction and remedial cementing, spacer fluids are commonly utilized. Spacer fluids are often used in subterranean operations to facilitate improved displacement efficiency when introducing new fluids into a well bore. For example, a spacer fluid can be used to displace a fluid in a well bore before introduction of another fluid. When used for drilling fluid displacement, spacer fluids can enhance solids removal as well as separate the drilling fluid from a physically incompatible fluid. For instance, in primary cementing operations, the spacer fluid may be placed into the well bore to separate the cement composition from the drilling fluid. Spacer fluids may also be placed between different drilling fluids during drilling change outs or between a drilling fluid and a completion brine, for example.

To be effective, the spacer fluid can have certain characteristics. For example, the spacer fluid may be compatible with the drilling fluid and the cement composition. This compatibility may also be present at downhole temperatures and pressures. In some instances, it is also desirable for the spacer fluid to leave surfaces in the well bore water wet, thus facilitating bonding with the cement composition. Rheology of the spacer fluid can also be important. A number of different rheological properties may be important in the design of a spacer fluid, including yield point, plastic viscosity, gel strength, and shear stress, among others. While rheology can be important in spacer fluid design, conventional spacer fluids may not have the desired rheology at downhole temperatures. For instance, conventional spacer fluids may experience undesired thermal thinning at elevated temperatures. As a result, conventional spacer fluids may not provide the desired displacement in some instances.

BRIEF DESCRIPTION OF THE DRAWINGS

These drawings illustrate certain aspects of some of the examples of the present disclosure and should not be used to limit or define the disclosure.

DETAILED DESCRIPTION

Figure 1:
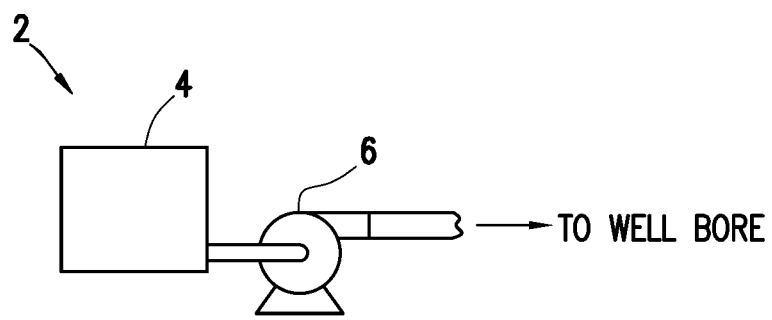
FIG. 1 is a schematic illustration of an example system for the preparation and delivery of a spacer fluid including agglomerated zeolite catalyst to a wellbore.

The present disclosure may relate to cementing, and in particular, to methods, compositions, and systems utilizing a spacer fluid which includes an agglomerated zeolite catalyst. Exemplary spacer fluids of the present disclosure may include water and agglomerated zeolite catalyst. Agglomerated zeolite catalyst may be a by-product material generated from a number of industrial refining and chemical processes such as hydrocracking and fluidized catalytic cracking. As discussed above, viscosity may be a design factor for spacer fluids. Spacer fluids may exhibit thinning or loss of viscosity with shear and increased temperature which may reduce the effectiveness of the spacer fluid in removing wellbore solids, filter cake, and drilling fluid from the wellbore. As will be discussed in further detail below, spacer fluids that include agglomerated zeolite catalyst may exhibit desirable properties such as relatively flat rheology with increased temperature and consolidation, if desired.

Agglomerated zeolite catalysts (AZC) may be used in fluidized bed catalytic cracking (FCC) processes to convert low value, high molecular weight hydrocarbons into high value, low molecular weight hydrocarbons such as gasoline, propylene, isobutylene, and others. These catalysts, often referred to as FCC catalysts, may be primarily composed of small zeolite crystals that have been agglomerated with clays, binders, or other methods into spherical pellets with sizes typically ranging from 50 microns to 150 microns. FCC catalysts may have a limited life-span due to the gradual physical and chemical degradation and deactivation of the FCC catalyst. Chemical degradation may include reaction of a compound with the catalytic phase resulting in loss of reactivity of the catalytic phase. Catalyst poisoning may occur when a catalyst poison permanently deactivates the catalytic sites in the catalyst by binding to the site. Physical changes in the catalyst such as deposition and buildup of impurities may also reduce the catalytic activity. Catalysts may be regenerated multiple times, typically by high-temperature treatments, to burn off impurities and restore or increase the catalytic activity. High-temperature regeneration may also cause other physical changes within the catalyst such as transformation of the zeolite from a crystalline structure to an amorphous structure, for example. These physical and chemical changes may render the catalytic activity of the catalyst too low for the intended application, such as FCC. Once a catalyst has been utilized in the cracking process, or other industrial processes described below, the catalyst may be described as "spent" and be referred to as a spent agglomerate zeolite catalyst. A spent catalyst may be a catalyst which has undergone physical and/or chemical changes such that the reactivity is reduced for its intended use.

In addition to FCC uses, AZCs may be encountered in many other industrial catalytic processes including, but not limited to, hydrocracking, gasoline desulfurization, light paraffin isomerization, reformate upgrading, distillate dewaxing by cracking, lube dewaxing by cracking, distillate dewaxing by isomerization, lube dewaxing by isomerization, diesel aromatics saturation, olefin skeletal isomerization, benzene reduction, light olefin interconversion, and olefin oligomerization to fuels and lubes, for example. In addition, AZCs may be found in separation applications including, but not limited to, drying, gas bulk separations/purification, n-Paraffins, iso-paraffins, and aromatics separation, biofilter media, absorbents for oil and spills, water/alcohol separations, water/olefin containing gas separations, carbon dioxide/ethylene and natural gas separations, removal of sulfur compounds from gas and liquified petroleum gas, nitrogen oxides/nitrogen separations, liquid bulk separations/purification, p-xylene/o-xylene, m-xylene separation, olefin/paraffin separations, fructose/glucose separation, and sulfur compounds/organics separations, for example. There may be uses for agglomerated zeolite catalyst in ion exchange applications such as, without limitation, water softening, water softening in detergents, water and waste-water treatment, ammonia removal, removal of heavy metals, and soil treatment, for example.

AZCs may typically be composed of four components: a matrix, a filler, a binder and zeolite crystals. Zeolites are microporous aluminosilicate minerals composed of silica and alumina tetrahedra. The zeolite component may be any zeolite such as, without limitation, type x, type y, ultra-stable type y, ZSM-5, SAPO-11, silicalite-1, mordenite, ferrierite, and beta. The binder may include an aluminate compound, and the filler may be a clay such as, without limitation, metakaolin, kaolin, attapulgite, bentonite, and others. The matrix may be an amorphous solid that may include kaolin filler and silica sol binder, for example. In some examples, the AZC may additionally include components such as, without limitation, alumina, silica, phosphorous pentoxide, sulfur trioxide, calcium oxide, iron oxide, cobalt oxide, nickel oxide, molybdenum oxide, magnesium oxide and combinations thereof. The components of the AZC may be mixed together in slurry form and then spray dried to obtain spherical agglomerates. These agglomerates may then calcined, for example, at around 500° C., to obtain the final AZC.

The AZC may be included in a spacer fluid "as is," meaning that no additional treatment or processing is performed on the AZC before inclusion in the spacer fluid. As mentioned above, the AZC may be considered spent after the catalytic activity has decreased below a threshold level where the catalyst does not have enough remaining catalytic activity to continue to be used for the intended purpose. Alternatively, additional treatments may be performed on the spent AZC before inclusion in the cement spacer, such as, cleaning, sintering, calcining, or other treatments.

AZCs may have many beneficial properties that make them suitable for inclusion in spacer fluids, only some of which may be enumerated herein. For example, AZC may have a relatively high water requirement as compared to other spacer fluid components. A water requirement may be the water required to fully hydrate a spacer component or additive, including AZC. Water requirement is typically defined as the amount of mixing water that is required to be added to a powdered, solid material to form a slurry of a specified consistency. The consistency may vary for a particular application. Spacer components may be analyzed to determine their water requirement. The following example technique for determining water requirement holds the consistency and amount of water constant while varying the amount of the solid material. However, techniques may also be applied that vary the amount of the water, the consistency, and/or the amount of solid material in any combination. The following technique also estimates the specified consistency based on the size of the vortex at the surface of the mixture in the blender. Water requirement for a particular spacer component may be determined by a process that includes a) preparing a blender (e.g., Waring® blender) with a specified amount of water (e.g., about 100 grams to about 500 grams), b) agitating the water at a specified blender rpm (e.g., 4,000 to 15,000 rpm), c) adding the powdered solid that is being investigated to the water until a specified consistency is obtained, and d) calculating the water requirement based on the ratio of water to solids required to obtain the desired consistency. A specific example for determining water requirement may include, but is not limited to: 1) preparing a blender (e.g., Waring® blender) with a specified amount of water (e.g., about 100 grams to about 500 grams or about 200 grams in one example); 2) agitating the water at a specified blender rpm (e.g., about 4,000 to about 15,000 rpm or about 12,000 rpm in one example); 3) adding a specified amount (e.g., about 1 gram to about 1,000 grams or about 400 grams in one example) of the spacer component to the water to form a mixture; 4) observing the mixture to determine if a specified consistency is obtained, for example, the spacer component can be considered thoroughly wet and mixed if the vortex formed at the surface of the mixture in the blender is about 0 inches (0 mm) to about 2 inch (50 mm) or about 0.004 inches (0.1 mm) to about 1 inch (25 mm); 5) if the desired consistency is not obtained, adding more spacer component until desired consistency is obtained, for example, the vortex formed in the blender is about the size of a dime; and 6) calculating the water requirement based on the ratio of water to spacer component to obtain the desired consistency. In some examples, the specific consistency may be where a vortex at the surface of the mixture in the blender is the size of a dime or about 0.7 in (17.9 mm). Other suitable techniques for determining the water requirement may also be used as will be appreciated by those of ordinary skill in the art.

Some examples of AZC may have a water requirement at a point in a range of about 60 grams to about 150 grams of water per 100 grams of AZC. Alternatively, the AZC may have water requirement at a point in a range of from about 60 to about 70 grams of water per 100 grams of AZC, at a point in a range of from about 70 to about 80 grams of water per 100 grams of AZC, at a point in a range of from about 80 to about 90 grams of water per 100 grams of AZC, at a point in a range of from about 90 to about 100 grams of water per 100 grams of AZC, at a point in a range of from about 100 to about 125 grams of water per 100 grams of AZC, at a point in a range of from about 125 to about 150 grams of water per 100 grams of AZC, or any points there between. Any ranges of water requirement disclosed herein are merely exemplary and the water requirement for any particular sample of AZC may fall outside the ranges explicitly recited.

The water requirement of AZC may be a function of the physical properties of the AZC including porosity, pore volume, pore size, and internal surface area for example. Some examples of the AZC may have an average pore volume at a point in a range of from about 0.01 $cm^3/g$ to about 0.20 $cm^3/g$. Alternatively, the AZC may have an average pore volume at a point in a range of from about 0.01 $cm^3/g$ to about 0.05 $cm^3/g$, at a point in a range of from about 0.05 $cm^3/g$ to about 0.10 $cm^3/g$, at a point in a range of from about 0.10 $cm^3/g$ to about 0.15 $cm^3/g$, at a point in a range of from about 0.15 $cm^3/g$ to about 0.20 $cm^3/g$, or any points therebetween. Some examples of the AZC may have a multi-modal pore size distribution due to the pores of the zeolite being smaller in scale versus the pores associated with the matrix the zeolite is bound to. The pore size of the zeolite component of the AZC may exhibit an average pore size of in a range of from about 1 Å to about 50 Å. Alternatively, the zeolite component may have an average pore size at a point in a range of from about 1 Å to about 10 Å, at a point in a range of from 10 Å to about 20 Å, at a point in a range of from about 20 Å to about 30 Å, at a point in a range of from about 30 Å to about 40 Å, at a point in a range of from about 40 Å to about 50 Å, or any at any points therebetween. The pore size of the matrix component of the AZC may exhibit an average pore size at a point in a range of from about 1 nm to about 100 nm. Alternatively, the matrix component may have an average pore size at a point in a range of from about 1 nm to about 30 nm, at a point in a range of from 30 nm to about 60 nm, at a point in a range of from about 60 nm to about 100 nm, or any at any points therebetween.

Some examples of the AZC may have an average internal surface area as measured by the Brunauer-Emmett-Teller (BET) method at a point in a range of about 100 m$^2$/g to about 250 m$^2$/g. BET surface area may be a function of a plurality of factors, including, but not limited to the AZC manufacturing process, identity of the zeolite and matrix, and fouling from the reaction conditions the AZC was exposed to for example. Alternatively, the AZC may have a BET surface area at a point in a range of about 100 m$^2$/g to about 150 m$^2$/g, at a point in a range of about 150 m$^2$/g to about 175 m$^2$/g, at a point in a range of about 175 m$^2$/g to about 200 m$^2$/g, or any points therebetween. Any ranges of porosity, pore volume, pore size, and internal surface area of AZC disclosed herein are merely exemplary and the physical properties for any particular sample of AZC may fall outside the ranges explicitly recited.

The AZCs may have any particle size ($D_v50$) suitable for a particular application, including at a point in a range of from about 10 μm to about 200 μm. The $D_v50$ particle size may also be referred to as the median particle size by volume of a particulate material. The $D_v50$ particle size is defined as the maximum particle diameter below which 50% of the material volume exists. The $D_v50$ particle size values for a particular sample may be measured by commercially available particle size analyzers such as those manufactured h Malvern Instruments, Worcestershire, United Kingdom. Alternatively, the AZCs may have a particle size in a range of from about 10 μm to about 50 μm, at a point in a range of from about 50 μm to about 100 μm, at a point in a range of from about 100 μm to about 150 μm, at a point in a range of from about 150 μm to about 200, or any points therebetween.

The AZCs may have any specific gravity suitable for a particular application. One of the potential advantages of including an AZC in a cement composition is that AZC is a relatively low-density material owing to the porosity of the AZC. Some examples of AZC may have a specific gravity at a point in a range of about 1.7 to about 3.3. Alternatively, the AZC may have a specific gravity at a point in a range of from about 1.7 to about 2, at a point in a range of from about 2 to about 2.3, at a point in a range of from about 2.3 to about 2.6, at a point in a range of from about 2.6 to about 3, at a point in a range of from about 3 to about 3.3, or any ranges therebetween. Any specific gravity disclosed herein are merely exemplary and the specific gravity for any particular sample of AZC may fall outside the ranges explicitly recited.

As mentioned above, the spacer fluids of the present disclosure may include water and AZC. In accordance with at least some examples, the spacer fluid may be used to displace a first fluid from a well bore with the spacer fluid having a higher yield point than the first fluid. For example, the spacer fluid may be used to displace at least a portion of a drilling fluid from the well bore. Other optional additives may also be included in examples of the spacer fluids as desired for a particular application. For example, the spacer fluids may further comprise viscosifying agents, polymers, dispersants, surfactants, weighting agents, and any combination thereof. The AZC may be included to the spacer fluid in any desired concentration, including at a point in a range of from about 1% to about 80% by weight of the spacer fluid. Alternatively, the AZC may be present in the spacer fluid at a point in a range of from about 1% to about 10% by weight of the spacer fluid, at a point in a range of from about 10% to about 20% by weight of the spacer fluid, at a point in a range of from about 20% to about 30% by weight of the spacer fluid, at a point in a range of from about 30% to about 40% by weight of the spacer fluid, at a point in a range of from about 40% to about 50% by weight of the spacer fluid, at a point in a range of from about 50% by weight of the cement composition to about 60% by weight of the spacer fluid, at a point in a range of from about 60% to about 70% by weight of the spacer fluid, at a point in a range of from about 70% to about 80% by weight of the spacer fluid, or any points therebetween.

The water included in the spacer fluid may be from any source provided that it does not contain an excess of compounds that may undesirably affect other components in the spacer fluid. For example, a spacer fluid may include freshwater, saltwater such as brine (e.g., saturated saltwater produced from subterranean formations) or seawater, or any combination thereof. Saltwater generally may include one or more dissolved salts therein and may be saturated or unsaturated as desired for a particular application. Seawater or brines may be suitable for use in some examples of the spacer fluid. Further, the water may be present in an amount sufficient to form a pumpable slurry. Generally, the water may be included to the spacer fluid in any desired concentration, including at a point in a range of from about 10% to about 80% by weight of the spacer fluid. Alternatively, the water may be present in the spacer fluid at a point in a range of from an amount of about 10% to about 30% by weight of the spacer fluid, at a point in a range of from about 30% to about 50% by weight of the spacer fluid, at a point in a range of from about 50% to about 60% by weight of the spacer fluid, at a point in a range of from about 60% to about 70% by weight of the spacer fluid, at a point in a range of from about 70% to about 80% by weight of the spacer fluid or any points therebetween.

The spacer fluid may have a density suitable for a particular application. By way of example, the spacer fluid may have a density at a point in a range of from about of from about 4 pounds per gallon ("lb/gal") (479 kg/m$^3$) to about 20 lb/gal (2396 kg/m$^3$). Alternatively, the spacer fluid may have a density at a point in a range of from about 4 lb/gal (479 kg/m$^3$) to about 7 lb/gal (839 kg/m$^3$), at a point in a range of from about 7 lb/gal (839 kg/m$^3$) to about 10 (1198 kg/m$^3$), at a point in a range of from about 10 lb/gal (1198 kg/m$^3$) to about 13 lb/gal (1558 kg/m$^3$), at a point in a range of from about 13 lb/gal (1558 kg/m$^3$), to about 16 lb/gal, at a point in a range of from about 16 lb/gal to about 20 lb/gal, or any points therebetween. As discussed above, the density of spacer fluid may be a design factor as the density range of cement may be limited by the formation properties. One method to control density may be to increase the fraction of water included in the spacer fluid. However, increasing water fraction may lead to a stratification of the spacer fluid whereby free water may separate from the bulk spacer fluid. One of the potential advantages of including AZC in the spacer fluid is that AZC is a relatively low-density material compared to other solid spacer components, has a high water requirement, and has pozzolanic activity that may contribute to compressive strength. Pozzolanic activity may be the ability of a compound to react with lime, typically in the form of hydrated lime, to form a hardened mass. Spacer fluid prepared with AZC may be prepared to lower densities than spacer fluids which do not contain AZC. AZC may absorb excess water resulting in more stable spacer fluid as compared to spacer fluids which do not contain AZC. As will be illustrated in the examples below, spacer fluids which include AZC may consolidate to form a hardened mass which may be advantageous to stabilizing wellbores and conduits disposed therein.

In some examples, the spacer fluids may further include a lightweight additive. The lightweight additive may be included to reduce the density of examples of the spacer fluids. For example, the lightweight additive may be used to form a lightweight spacer fluid, for example, having a density of less than about 13 ppg. The lightweight additive typically may have a specific gravity of less than about 2.0. Examples of suitable lightweight additives may include sodium silicate, hollow microspheres, gilsonite, perlite, and combinations thereof. Where used, the lightweight additive may be present in an amount in the range of from about 0.1% to about 20% by weight of dry solids, for example. In alternative examples, the lightweight additive may be present in an amount in the range of from about 1% to about 10% by weight of dry solids.

In some examples, the spacer fluids may be foamed and include water, AZC, a foaming agent, and a gas. Optionally, to provide a spacer fluid with a lower density and more stable foam, the foamed spacer fluid may further comprise a lightweight additive, for example. With the lightweight additive, a base slurry may be prepared that may then be foamed to provide an even lower density. In some embodiments, the foamed spacer fluid may have a density in the range of from about 4 ppg (479 kg/m$^3$) to about 13 ppg (1558 kg/m$^3$) and, alternatively, about 7 ppg (839 kg/m$^3$) to about 9 ppg (839 kg/m$^3$). In one particular example, a base slurry may be foamed from a density of in the range of from about 9 ppg (839 kg/m$^3$) to about 13 ppg (1558 kg/m$^3$) to a lower density, for example, in a range of from about 7 ppg (839 kg/m$^3$) to about 9 ppg (839 kg/m$^3$).

The gas used in embodiments of the foamed spacer fluids may be any suitable gas for foaming the spacer fluid, including, but not limited to air, nitrogen, and combinations thereof. Generally, the gas should be present in examples of the foamed spacer fluids in an amount sufficient to form the desired foam. In certain embodiments, the gas may be present in an amount in the range of from about 5% to about 80% by volume of the foamed spacer fluid at atmospheric pressure, alternatively, about 5% to about 55% by volume, and, alternatively, about 15% to about 30% by volume.

Where foamed, examples of the spacer fluids may comprise a foaming agent for providing a suitable foam. As used herein, the term "foaming agent" refers to a material or combination of materials that facilitate the formation of a foam in a liquid. Any suitable foaming agent for forming a foam in an aqueous liquid may be used in embodiments of the spacer fluids. Examples of suitable foaming agents may include, but are not limited to: anionic, nonionic, amphoteric (including zwitterionic surfactants), cationic surfactant, or mixtures thereof, betaines; anionic surfactants such as hydrolyzed keratin; amine oxides such as alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyltallowammonium chloride and trimethylcocoammonium chloride; C8 to C22 alkylethoxylate sulfates; and combinations thereof. Specific examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant, mixtures of an ammonium salt of an alkyl ether sulfate, and combinations thereof. Generally, the foaming agent may be present in embodiments of the foamed spacer fluids in an amount sufficient to provide a suitable foam. In some embodiments, the foaming agent may be present in an amount in the range of from about 0.8% to about 5% by volume of the water ("bvow").

The spacer fluid may include a natural pozzolan such as fly ash, silica fume, metakaolin, or combinations thereof. An example of a suitable pozzolan may include fly ash. A variety of fly ash may be suitable, including fly ash classified as Class C and Class F fly ash according to American Petroleum Institute, API Specification for Materials and Testing for Well Cements, API Specification 10, Fifth Ed., Jul. 1, 1990. Class C fly ash includes both silica and lime, so it may set to form a hardened mass upon mixing with water. Class F fly ash generally does not contain a sufficient amount of lime to induce a cementitious reaction, therefore, an additional source of calcium ions is necessary for consolidation embodiments of a spacer fluid including Class F fly ash. In some examples, lime may be mixed with Class F fly ash in an amount in the range of about 0.1% to about 100% by weight of the fly ash. In some instances, the lime may be hydrated lime. An example of a suitable pozzolan may include metakaolin. Generally, metakaolin is a white pozzolan that may be prepared by heating kaolin clay to temperatures in the range of about 600° C. to about 800° C. Where used, the metakaolin may be present in an amount in the range of from about 0.1% to about 40% by weight of the spacer fluid. For example, the metakaolin may be present in an amount ranging between any of and/or including any of about 0.1%, 10%, about 20%, about 30%, or about 40% by weight of the spacer fluid. An additional example of a suitable pozzolan may include a natural pozzolan. Natural pozzolans are generally present on the Earth's surface and set and harden in the presence of hydrated lime and water. Examples including of natural pozzolans may include natural glasses, diatomaceous earth, volcanic ash, opaline shale, tuff, and combinations thereof. The natural pozzolans may be ground or unground.

The spacer fluid may further include hydrated lime. As used herein, the term "hydrated lime" will be understood to mean calcium hydroxide. In some examples, the hydrated lime may be provided as quicklime (calcium oxide) which hydrates when mixed with water to form the hydrated lime. The hydrated lime may be included in examples of the consolidating embodiments of the spacer fluid, for example, to form a hydraulic composition with the pozzolan or AZC. For example, the hydrated lime may be included in a pozzolan or AZC-to-hydrated-lime weight ratio of about 10:1 to about 1:1 or a ratio of about 3:1 to about 5:1. Where present, the hydrated lime may be included in the spacer fluids in an amount at a point in a range of from about 1% to about 40% by weight of the spacer fluid, for example. In some examples, the hydrated lime may be present in an amount ranging between any of and/or including any of about 1%, about 10%, about 20%, about 30%, or about 40% by weight of the spacer fluid. In some examples, cementitious components present in the spacer fluid may consist essentially of AZC and hydrated lime. For example, the cementitious components may primarily include the AZC and the hydrated lime without any additional cementitious components (e.g., Portland cement) that hydraulically set in the presence of water.

Some examples of the spacer fluid may include silica sources in addition to the AZC; for example, crystalline silica and/or amorphous silica. Amorphous silica is a powder that may be included in examples of the spacer fluid as a lightweight filler. Amorphous silica is generally a byproduct of a ferrosilicon production process, wherein the amorphous silica may be formed by oxidation and condensation of gaseous silicon suboxide, SiO, which is formed as an intermediate during the process. Examples including additional silica sources may utilize the additional silica source as needed to enhance compressive strength or set times in consolidating embodiments of the spacer fluids.

In consolidating examples of the spacer fluid, the spacer fluid may consolidate to form a mass that resists deformation. Consolidating examples of the spacer fluid may include water, AZC, and a source of calcium and hydroxide ions such as lime, for example. As discussed above, AZC may contain components that are able to participate in the pozzolanic reaction. In general, pozzolans are able to participate in the pozzolanic reaction through reaction of the silaceous and/or aluminous components of the pozzolan with calcium ions and hydroxide ions in water. The pozzolanic reaction may cause the spacer fluid to form compressive strength. Compressive strength is generally the capacity of a material or structure to withstand axially directed pushing forces. The compressive strength may be measured according to techniques set forth in API RP-10B-2, Recommended Practice for Testing Well Cements, $2^{nd}$ Edition published April 2013. Compressive strength is generally measured at a specified time after the spacer fluid has been prepared and the resultant composition is maintained under specified temperature and pressure conditions. Compressive strength can be measured by either destructive or non-destructive methods. The destructive method physically tests the strength of consolidated spacer fluids at various points in time by crushing the samples in a compression-testing machine. The compressive strength is calculated from the failure load divided by the cross-sectional area resisting the load and is reported in units of pound-force per square inch (psi). Non-destructive methods may employ a USA™ ultrasonic cement analyzer, available from Fann® Instrument Company, Houston, Tex. Compressive strength values may be determined in accordance with API RP-10B-2, Recommended Practice for Testing Well Cements, $2^{nd}$ Edition published April 2013.

By way of example, consolidating embodiments of the spacer fluid may develop a 24-hour compressive strength in the range of from about 10 psi to about 200 psi, alternatively, from about 10 psi to about 50 psi, alternatively from about 50 psi to about 100 psi, alternatively from about 100 psi to about 150 psi, or alternatively from about 150 psi to about 200 psi. In some examples of consolidation spacer fluid embodiments, the spacer fluids may develop a compressive strength in 24 hours of at least about 10 psi, at least about 50 psi, or at least about 100 psi. In some examples, the compressive strength values may be determined using destructive or non-destructive methods at a temperature ranging from 100° F. to 200° F.

The spacer fluid may further include kiln dust. "Kiln dust," as that term is used herein, refers to a solid material generated as a by-product of the heating of certain materials in kilns. The term "kiln dust" as used herein is intended to include kiln dust made as described herein and equivalent forms of kiln dust. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on a number of factors, including the particular kiln feed, the efficiencies of the cement production operation, and the associated dust collection systems. Cement kiln dust generally may include a variety of oxides, such as $SiO_2$, $Al_2O_3$, $Fe_2O_3$, CaO, MgO, $SO_3$, $Na_2O$, and $K_2O$. Problems may also be associated with the disposal of lime kiln dust, which may be generated as a by-product of the calcination of lime. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides.

The spacer fluids may further include barite. In some examples, the barite may be present in the spacer fluids in an amount in the range of from about 1% to about 60% by weight of the spacer fluid (e.g., about 5%, about 10%, about 15%, about 20%, about 25%, about 30%, about 35%, about 40%, about 45%, about 50%, about 55%, etc.). In some examples, the barite may be present in the spacer fluids in an amount in the range of from about 1% to about 35% by weight of the spacer fluid. In some examples, the barite may be present in the spacer fluids in an amount in the range of from about 1% to about 10% by weight of the spacer fluid. Alternatively, the amount of barite may be expressed by weight of dry solids. For example, the barite may be present in an amount in a range of from about 1% to about 99% by weight of dry solids (e.g., about 1%, about 5%, about 10%, about 20%, about 30%, about 40%, about 50%, about 60%, about 70%, about 80%, about 90%, about 99%, etc.). In some examples, the barite may be present in an amount in the range of from about 1% to about 20% and, alternatively, from about 1% to about 10% by weight of dry solids.

In some embodiments, the spacer fluid may further include one or more of slag, perlite, shale, amorphous silica, or metakaolin. These additives may be included in the spacer fluids to improve one or more properties of the spacer fluid. The spacer fluids may further include slag. Slag is generally a granulated, blast furnace by-product from the production of cast iron including the oxidized impurities found in iron ore. Where used, the slag may be present in an amount in the range of from about 0.1% to about 40% by weight of the spacer fluid. For example, the spacer fluid may be present in an amount ranging between any of and/or including any of about 0.1%, about 10%, about 20%, about 30%, or about 40% by weight of the spacer fluid. The spacer fluid may further include perlite. Perlite is an ore and generally refers to a naturally occurring volcanic, amorphous siliceous rock including mostly silicon dioxide and aluminum oxide. The perlite may be expanded and/or unexpanded as suitable for a particular application. The expanded or unexpanded perlite may also be ground, for example. Where used, the perlite may be present in an amount in the range of from about 0.1% to about 40% by weight of the spacer fluid. For example, the perlite may be present in an amount ranging between any of and/or including any of about 0.1%, about 10%, about 20%, about 30%, or about 40% by weight of the spacer fluid. The spacer fluid may further include shale. A variety of shales are suitable, including those including silicon, aluminum, calcium, and/or magnesium. Examples of suitable shales include vitrified shale and/or calcined shale. Where used, the shale may be present in an amount in the range of from about 0.1% to about 40% by weight of the spacer fluid. For example, the shale may be present in an amount ranging between any of and/or including any of about 0.1%, about 10%, about 20%, about 30%, or about 40% by weight of the spacer fluid.

The spacer fluid may further include a free water control additive. As used herein, the term "free water control additive" refers to an additive included in a liquid for, among other things, reducing or preventing the presence of free water in the liquid. Free water control additive may also reduce or prevent the settling of solids. Examples of suitable free water control additives include, but are not limited to, bentonite, amorphous silica, hydroxyethyl cellulose, and combinations thereof. The free water control additive may be provided as a dry solid in some embodiments. Where used, the free water control additive may be present in an amount in the range of from about 0.1% to about 16% by weight of dry solids, for example. In alternative embodiments, the free water control additive may be present in an amount in the range of from about 0.1% to about 2% by weight of dry solids.

Optionally, fluid-loss-control additives may be included in the spacer fluids, for example, decrease the volume of fluid that is lost to the subterranean formation Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers including a backbone of lignin or lignite and pendant groups including at least one member selected from the group consisting of 2-acrylamido-2-methylpropanesulfonic acid, acrylonitrile, and N,N-dimethylacrylamide.

Optionally, lost-circulation materials may be included in the spacer fluids to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, formica, corncobs, cotton hulls, and combinations thereof.

Optionally, set accelerators may be included in consolidating examples of spacer fluids, for example, increase the rate of setting reactions. Control of setting time may allow for the ability to adjust to wellbore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof.

Optionally, set retarders may be included in consolidating examples of spacer fluids to, for example, increase the thickening time of the spacer fluids. Examples of suitable set retarders include, but are not limited to, ammonium, alkali metals, alkaline earth metals, borax, metal salts of calcium lignosulfonate, carboxymethyl hydroxyethyl cellulose, sulfoalkylated lignins, hydroxycarboxy acids, copolymers of 2-acrylamido-2-methylpropane sulfonic acid salt and acrylic acid or maleic acid, saturated salt, or a combination thereof. One example of a suitable sulfoalkylated lignin includes a sulfomethylated lignin.

As previously mentioned, the spacer fluids may consolidate after placement in the wellbore. By way of example, the spacer fluids may develop gel and/or compressive strength when left in the wellbore. As a specific example of consolidation, when left in a wellbore annulus (e.g., between a subterranean formation and the pipe string disposed in the subterranean formation or between the pipe string and a larger conduit disposed in the subterranean formation), the spacer fluid may consolidate to develop static gel strength and/or compressive strength. The consolidated mass formed in the wellbore annulus may act to support and position the pipe string in the wellbore and bond the exterior surface of the pipe string to the walls of the wellbore or to the larger conduit. The consolidated mass formed in the wellbore annulus may also provide a substantially impermeable barrier to seal off formation fluids and gases and consequently also serve to mitigate potential fluid migration. The consolidated mass formed in the wellbore annulus may also protect the pipe string or other conduit from corrosion.

The spacer fluids may be prepared in accordance with any suitable technique. In some examples, the desired quantity of water may be introduced into a mixer (e.g., a cement blender) followed by a dry blend of the spacer fluid components. The dry blend may comprise the AZC and additional solid additives such as those described above. Additional liquid additives, if any, may be added to the water as desired prior to, or after, combination with the dry blend. This mixture may be agitated for a sufficient period of time to form a pumpable slurry. By way of example, pumps may be used for delivery of this pumpable slurry into the wellbore.

An example method may include a method of displacing a first fluid from a wellbore, the wellbore penetrating a subterranean formation. The method may include providing a spacer fluid that comprises AZC and water. One or more additives may also be included in the spacer fluid as discussed herein. The method may further comprise introducing the spacer fluid into the wellbore to displace at least a portion of the first fluid from the wellbore. In some examples, the spacer fluid may displace the first fluid from a wellbore annulus, such as the annulus between a pipe string and the subterranean formation or between the pipe string and a larger conduit. In some examples, the first fluid displaced by the spacer fluid includes a drilling fluid. By way of example, the spacer fluid may be used to displace the drilling fluid from the wellbore. In addition to displacement of the drilling fluid from the wellbore, the spacer fluid may also remove the drilling fluid from the walls of the wellbore. Additional steps in examples of the method may comprise introducing a pipe string into the wellbore, introducing a cement composition into the wellbore with the spacer fluid separating the cement composition and the first fluid. In an embodiment, the cement composition may be allowed to set in the wellbore. The cement composition may include, for example, cement and water.

Another example method may include using a spacer fluid including AZC and water to displace a drilling fluid in a wellbore. One or more additives may also be included in the spacer fluid as discussed herein. The method may further include introducing a cement composition into the wellbore after the spacer fluid, wherein the spacer fluid separates the cement composition from the drilling fluid. Any of the examples of a spacer fluid described herein may apply in the context of this example method.

An example method may include a method of displacing a first fluid from a wellbore, the wellbore penetrating a subterranean formation. The method may include providing a spacer fluid that comprises AZC, water, and a source of hydroxide ions such as lime. One or more additional additives may also be included in the spacer fluid as discussed herein. The method may further include allowing the spacer fluid to consolidate to form a hardened mass within an annular space between the subterranean formation and a conduit.

Accordingly, the present disclosure may provide methods, systems, and apparatus that may relate to spacer fluids including AZCs. The methods, systems, and apparatus may include any of the various features disclosed herein, including one or more of the following statements.

Statement 1. A method comprising: providing a spacer fluid comprising water and an agglomerated zeolite catalyst; and displacing a drilling fluid in a wellbore using the spacer fluid.

Statement 2. The method of statement 1 wherein the spacer fluid further comprises hydrated lime.

Statement 3. The method of statement 2 further comprising allowing the spacer fluid to consolidate in an annular space in the wellbore.

Statement 4. The method of any of statements 1-2 wherein the agglomerated zeolite catalyst is a spent agglomerated zeolite catalyst.

Statement 5. The method of any of statements 1-3 wherein the agglomerated zeolite catalyst comprises a matrix, a filler, a binder, and zeolite crystals.

Statement 6. The method of statement 5 wherein the zeolite crystals are selected from the group consisting of type x, type y, ultra-stable type y, ZSM-5, SAPO-11, silicalite-1, mordenite, ferrierite, beta, and combinations thereof.

Statement 7. The method of any of statements 1-6 wherein the agglomerated zeolite catalyst is present in an amount of about 1% to about 80% by weight of the spacer fluid.

Statement 8. A method comprising: introducing a spacer fluid comprising agglomerated zeolite catalyst, hydrated lime, and water into a wellbore annulus such that the spacer fluid discplaces a drilling fluid in the wellbore annulus; and introducing a cement composition into the wellbore annulus after the spacer fluid, wherein at least a portion of the spacer fluid consolidates in the wellbore annulus to form a hardened mass.

Statement 9. The method of statement 8 wherein the agglomerated zeolite catalyst is a spent agglomerated zeolite catalyst.

Statement 10. The method of any of statements 8-9 wherein an agglomerated zeolite catalyst to hydrated lime weight ratio is about 1:3 to about 1:5, and wherein the spacer fluid is free of additional components that hydraulically set in the presence of water and hydrated lime.

Statement 11. The method of any of statements 8-10 wherein the agglomerated zeolite catalyst comprises a matrix, a filler, a binder, and zeolite crystals.

Statement 12. The method of statement 11 wherein the zeolite crystals are selected from the group consisting of type x, type y, ultra-stable type y, ZSM-5, SAPO-11, silicalite-1, mordenite, ferrierite, beta, and combinations thereof.

Statement 13. The method of any of statements 8-12 wherein the cement composition comprises water and a hydraulic cement selected from the group consisting of Portland cements, pozzolana cements, gypsum cements, alumina based cements, silica cements, and combinations thereof.

Statement 14. A composition comprising: an agglomerated zeolite catalyst; hydrated lime; and water.

Statement 15. The composition of statement 14 wherein the agglomerated zeolite catalyst is a spent agglomerated zeolite catalyst.

Statement 16. The composition of any of statements 14-15 wherein the agglomerated zeolite catalyst comprises a matrix, a filler, a binder, and zeolite crystals.

Statement 17. The composition of statement 16 wherein the matrix comprises type x, type y, ultra-stable type y, ZSM-5, SAPO-11, silicalite-1, mordenite, ferrierite, beta, or combinations thereof.

Statement 18. The composition of statement 17 wherein the matrix is an amorphous solid comprising kaolin filler and silica sol binder, wherein the filler is a clay, and wherein the binder is an aluminate compound.

Statement 19. The composition of any of statements 14-19 wherein an agglomerated zeolite catalyst to lime weight ratio is about 1:3 to about 1:5.

Statement 20. The composition of statement 19 wherein the composition is free of additional components which hydraulically set in the presence of water and hydrated lime.

Example methods of using the spacer fluids including AZC in well cementing will now be described in more detail with reference to FIGS. 1-4. FIG. 1 illustrates an example system 2 for preparation of a spacer fluid comprising AZC and water and delivery of the spacer fluid to a wellbore. As shown, the spacer fluid may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix a dry blend comprising the AZC and one or more optional additives described herein, for example, with the water as it is being pumped to the wellbore. Any of the embodiments of a spacer fluid described herein may apply in the context of FIG. 1.

Figure 2:
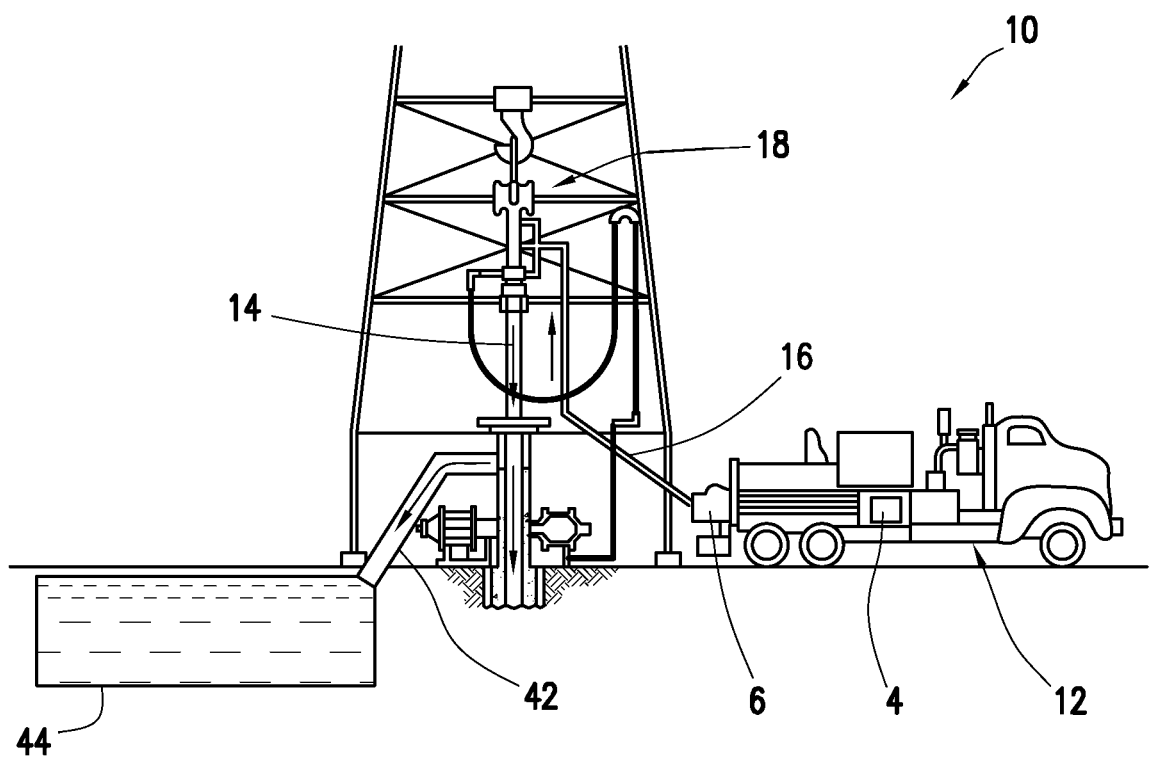
FIG. 2 is a schematic illustration of example surface equipment that may be used in the placement of a spacer fluid including agglomerated zeolite catalyst to a wellbore.

FIG. 2 illustrates example surface equipment 10 that may be used in placement of a spacer fluid and/or cement composition. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include mixing equipment 4 and pumping equipment 6 as will be apparent to those of ordinary skill in the art. The cementing unit 12 may pump a spacer fluid and/or cement composition in the direction indicated by arrows 14 through a feed pipe 16 and to a cementing head 18 which conveys the fluid downhole. Any of the embodiments of a spacer fluid described herein may apply in the context of FIG. 2 with respect to the spacer fluid. For example, the spacer fluid may include AZC, water, and one or more optional additives.

An example of using a spacer fluid 20 including AZC will now be described with reference to FIG. 3. Any of the embodiments of a spacer fluid described herein may apply in the context of FIG. 3 with respect to the spacer fluid 20. For example, the spacer fluid 20 may include AZC, water, and one or more optional additives.

Figure 3:
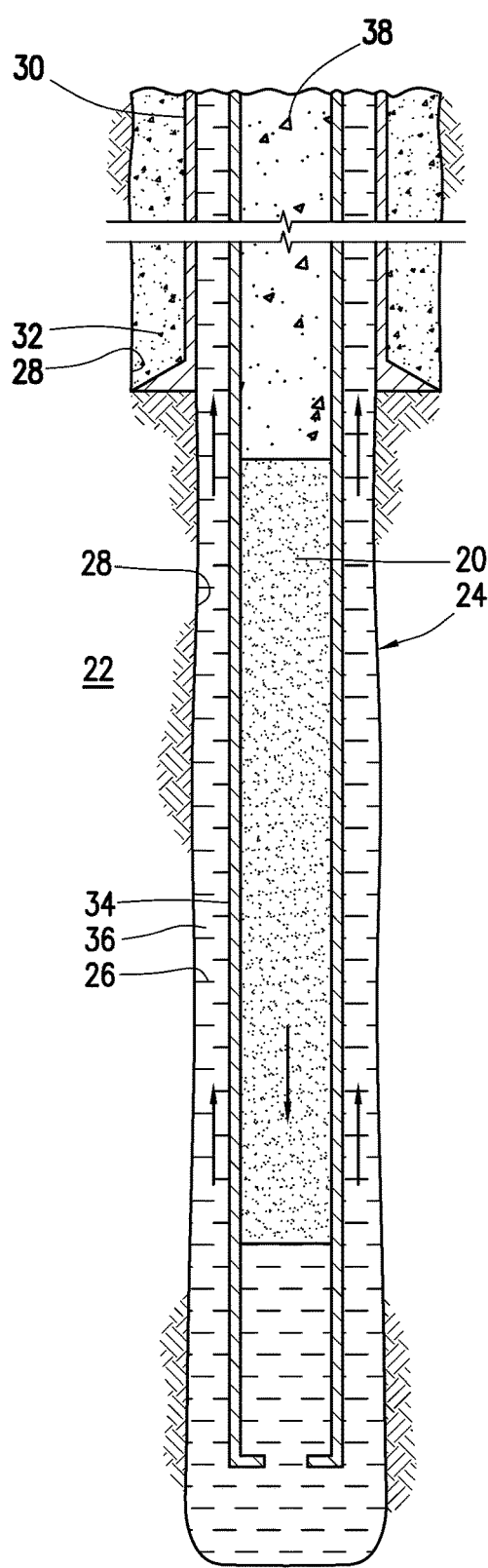
FIG. 3 is a schematic illustration of an example in which a spacer fluid including agglomerated zeolite catalyst is used between a cement composition and a drilling fluid.

FIG. 3 depicts one or more subterranean formations 22 penetrated by a wellbore 24 with drilling fluid 26 disposed therein. The drilling fluid 26 may include the example drilling fluids disclosed herein as well as other suitable drilling fluids that will be readily apparent to those of ordinary skill in the art. While the wellbore 24 is shown extending generally vertically into the one or more subterranean formations 22, the principles described herein are also applicable to wellbores that extend at an angle through the one or more subterranean formations 22, such as horizontal and slanted wellbores. As illustrated, the wellbore 24 comprises walls 28. In the illustrated embodiment, a surface casing 30 has been cemented to the walls 28 of the wellbore 24 by cement sheath 32. In the illustrated embodiment, one or more additional pipe strings (e.g., intermediate casing, production casing, liners, etc.), shown here as casing 34 may also be disposed in the wellbore 24. As illustrated, there is a wellbore annulus 36 formed between the casing 34 and the walls 28 of the wellbore 24 (and/or the surface casing 30). While not shown, one or more centralizers may be attached to the surface casing 30, for example, to centralize the casing 34 in the wellbore 24 prior to and during the cementing operation.

As illustrated, a cement composition 38 may be introduced into the wellbore 24. For example, the cement composition 38 may be pumped down the interior of the casing 34. The pump 6 shown on FIGS. 1 and 2 may be used for delivery of the cement composition 38 into the wellbore 24. It may be desired to circulate the cement composition 38 in the wellbore 24 until it is in the wellbore annulus 36. The cement composition 38 may include the example cement compositions disclosed herein as well as other suitable cement compositions that will be readily apparent to those of ordinary skill in the art. While not illustrated, other techniques may also be utilized for introduction of the cement composition 38. By way of example, reverse circulation techniques may be used that include introducing the cement composition 38 into the wellbore 24 by way of the wellbore annulus 36 instead of through the casing 34.

The spacer fluid 20 may be used to separate the drilling fluid 26 from the cement composition 38. The previous embodiments described with reference to FIG. 1 for preparation of a spacer fluid may be used for delivery of the spacer fluid 20 into the wellbore 24. Moreover, the pump 6 shown on FIGS. 1 and 2 may also be used for delivery of the spacer fluid 20 into the wellbore 24. The spacer fluid 20 may be used with the cement composition 38 for displacement of the drilling fluid 26 from the wellbore 24 as well as preparing the wellbore 24 for the cement composition 38. By way of example, the spacer fluid 20 may function, inter alia, to remove the drilling fluid 26, drilling fluid 26 that is dehydrated/gelled, and/or filter cake solids from the wellbore 24 in advance of the cement composition 38. While not shown, one or more plugs or other suitable devices may be used to physically separate the drilling fluid 26 from the spacer fluid 20 and/or the spacer fluid 20 from the cement composition 38.

Figure 4:
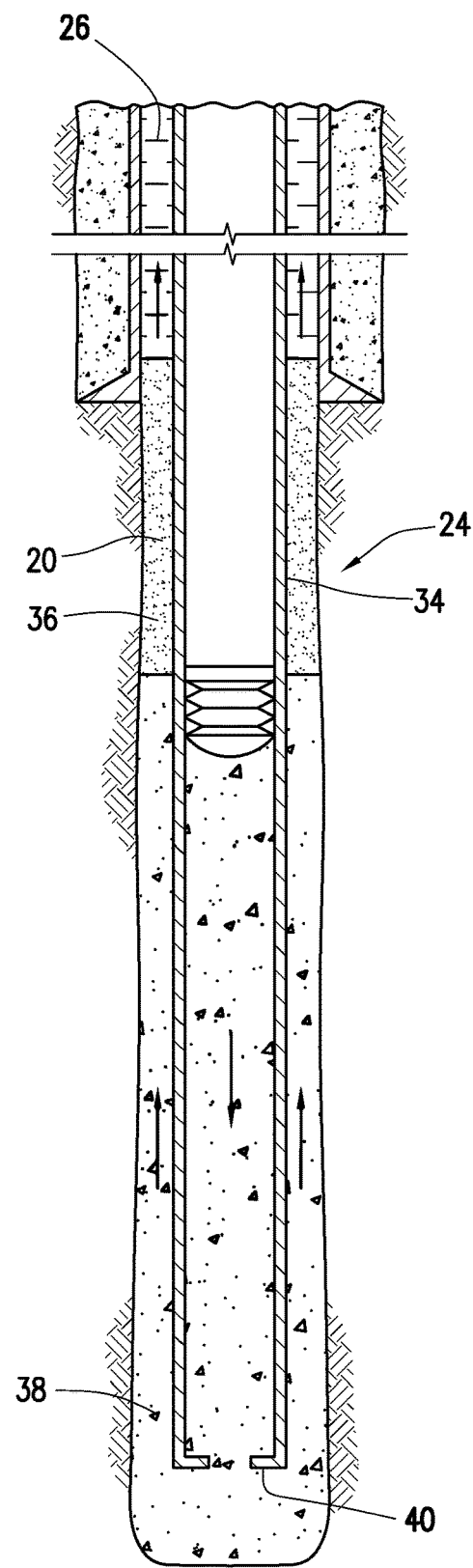
FIG. 4 is a schematic illustration of an example in which a spacer fluid including agglomerated zeolite catalyst is used in a wellbore.

Referring now to FIG. 4, the drilling fluid 26 has been displaced from the wellbore annulus 36 in accordance with certain embodiments. As illustrated, the spacer fluid 20 and the cement composition 38 may be allowed to flow down the interior of the casing 34 through the bottom of the casing 34 (e.g., casing shoe 40) and up around the casing 34 into the wellbore annulus 36, thus displacing the drilling fluid 26. At least a portion of the displaced drilling fluid 26 may exit the wellbore annulus 36 via a flow line 42 and be deposited, for example, in one or more retention pits 44 (e.g., a mud pit), as shown in FIG. 2. Turning back to FIG. 4, the cement composition 38 may continue to be circulated until it has reached a desired location in the wellbore annulus 36. The spacer fluid 20 and/or the cement composition 38 may be left in the wellbore annulus 36. As illustrated, the spacer fluid 20 may be disposed in the wellbore annulus 36 above or on top of the cement composition 38. The cement composition 38 may set in the wellbore annulus 36 to form an annular sheath of hardened, substantially impermeable material (i.e., a cement sheath) that may support and position the casing 34 in the wellbore 24. As previously mentioned, embodiments of the spacer fluid 20 may consolidate in the wellbore annulus 36. Thus, the spacer fluid 20 may help to stabilize the casing 34 while also serving to provide a barrier to protect the portion of the casing 34 from corrosive effects of water and/or water-based drilling fluids that would otherwise remain in the wellbore annulus 36 above the cement composition 38.

The exemplary cement compositions including AZC disclosed herein may directly or indirectly affect one or more components or pieces of equipment associated with the preparation, delivery, recapture, recycling, reuse, and/or disposal of the cement compositions and associated cement compositions. For example, the cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the agglomerated zeolite catalyst, or fluids containing the same, into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions such as, but not limited to, wellbore casings, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, terrorizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present disclosure, the following examples of some embodiments are given. In no way should such examples be read to limit, or to define, the scope of the disclosure.

Example 1

Non-consolidating spacer fluids were prepared to evaluate the rheological properties of spacer fluids containing AZC. The fluids were prepared by weighing dry components and dry blending the dry components until blended. The blended dry components were added to a blender and mixed with water at approximately 4,000 RPM. The blender speed was then increased to about 12,000 RPM for about 35 seconds. Table 1 lists the components of the formulated spacer fluids.

TABLE 1

| Material | Sample Fluid 1 Amt. (g) | Sample Fluid 2 Amt. (g) | Sample Fluid 3 Amt. (g) |
|---|---|---|---|
| AZC | 100.0 | 100.0 | 100.0 |
| Suspending Aid | 0.5 | 1.8 | 0.5 |
| Calcium Carbonate | — | 447.3 | — |
| Silica Sand | — | — | 263.2 |
| Water | 153.9 | 410.5 | 262.7 |
| Slurry Density | 11.0 | 13.0 | 13.0 |

The spacer fluids prepared according to Table 1 were tested using a Fann® Model 35 viscometer to determine rheology at different viscometer RPMs. Dial readings were recorded at speeds of 3, 5, 100, 200, and 300 RPM with an R1 rotor B1 bob, and a 1.0 spring. The dial readings versus RPM data for each of the three sample fluids were measured in accordance with API recommended Practices 10B $2^{nd}$ Edition Published April 2013.

TABLE 2

| Sample Fluid | Temp (F.) | Viscometer RPM | | | | | Apparent Viscosity at 1 1/sec (cP) | Apparent Viscosity at 10 1/sec (cP) | Apparent Viscosity at 100 1/sec (cP) |
|---|---|---|---|---|---|---|---|---|---|
| | | 300 | 200 | 100 | 6 | 3 | | | |
| 1 | 80 | 66 | 54 | 39 | 16 | 13 | 5202 | 782 | 159 |
| | 130 | 50 | 45 | 36 | 19 | 16 | 6338 | 942 | 160 |
| | 180 | 40 | 37 | 31 | 14 | 11 | 3653 | 700 | 134 |
| 2 | 80 | 85 | 67 | 46 | 18 | 15 | 6429 | 890 | 184 |
| | 130 | 69 | 55 | 39 | 15 | 12 | 5272 | 760 | 157 |
| | 180 | 51 | 42 | 30 | 13 | 9 | 5255 | 659 | 124 |
| 3 | 80 | 54 | 49 | 36 | 15 | 12 | 4140 | 748 | 157 |
| | 130 | 28 | 22 | 17 | 9 | 6 | 4068 | 460 | 71 |
| | 180 | 47 | 40 | 29 | 11 | 7 | 3525 | 555 | 120 |

The results from the rheology test are shown in Table 2. The results indicate that the spacer fluids containing the AZC have a relatively unchanged viscosity versus temperature relationship in the shear rate range from 10 to 100 1/sec. The formulated spacer fluids were then placed in an ultrasonic cement analyzer and heater to 180° F. (82° C.) for a period of 40-66 hours. Table 3 shows the results for each spacer fluid after heating. It can be observed that none of the tested spacer fluid exhibited consolidation after the heating.

TABLE 3

| Sample Fluid | T (° F.) | Time (hrs) | UCA C.S. (psi) |
|---|---|---|---|
| 1 | 180 | 66 | 0 |
| 2 | 180 | 50 | 0 |
| 3 | 180 | 40 | 0 |

Example 2

Spacer fluids were prepared according to Table 4. The fluids were prepared by weighing and dry blending the dry components followed by mixing in a blender at about 4,000 RPM followed by mixing at about 12,000 RPM for about 35 seconds.

TABLE 4

| Material | Sample Fluid 4 Amt. (g) | Sample Fluid 5 Amt. (g) |
|---|---|---|
| AZC | 100.0 | 100.0 |
| Suspending Aid | 1.4 | 0.0 |
| Hydrated Lime | 20.0 | 20.0 |
| Silica Sand | 263.1 | 40.0 |
| Portland Cement | — | — |
| Water | 273.3 | 123.0 |
| Slurry Density | 13.0 | 13.0 |

The spacer fluids prepared according to Table 4 were tested using a Fann® Model 35 viscometer to determine rheology at different viscometer RPMs. Dial readings were recorded at speeds of 3, 5, 100, 200, and 300 RPM with an R1 rotor B1 bob, and a 1.0 spring. The dial readings versus RPM data for each of the three sample fluids were measured in accordance with API recommended Practices 10B $2^{nd}$ Edition Published April 2013.

TABLE 5

| Sample Fluid | Temp (F.) | Viscometer RPM | | | | | | | Apparent Viscosity at 1 1/sec (cP) | Apparent Viscosity at 10 1/sec (cP) | Apparent Viscosity at 100 1/sec (cP) |
|---|---|---|---|---|---|---|---|---|---|---|---|
| | | 300 | 200 | 100 | 60 | 30 | 6 | 3 | | | |
| 4 | 80 | 45 | 39 | 32 | | | 15 | 12 | 4377 | 742 | 139 |
| | 130 | 36 | 33 | 28 | | | 13 | 10 | 3739 | 675 | 122 |
| | 180 | 30 | 27 | 22 | | | 9 | 7 | 2319 | 467 | 94 |
| 5 | 80 | 79 | 67 | 55 | 51 | 43 | 26 | 21 | 7090 | 1335 | 251 |
| | 130 | 205 | 148 | 96 | 85 | 56 | 51 | 51 | 25105 | 2648 | 403 |
| | 180 | 281 | 281 | 232 | 158 | 100 | 98 | 98 | 39283 | 5470 | 915 |

Figure 5:
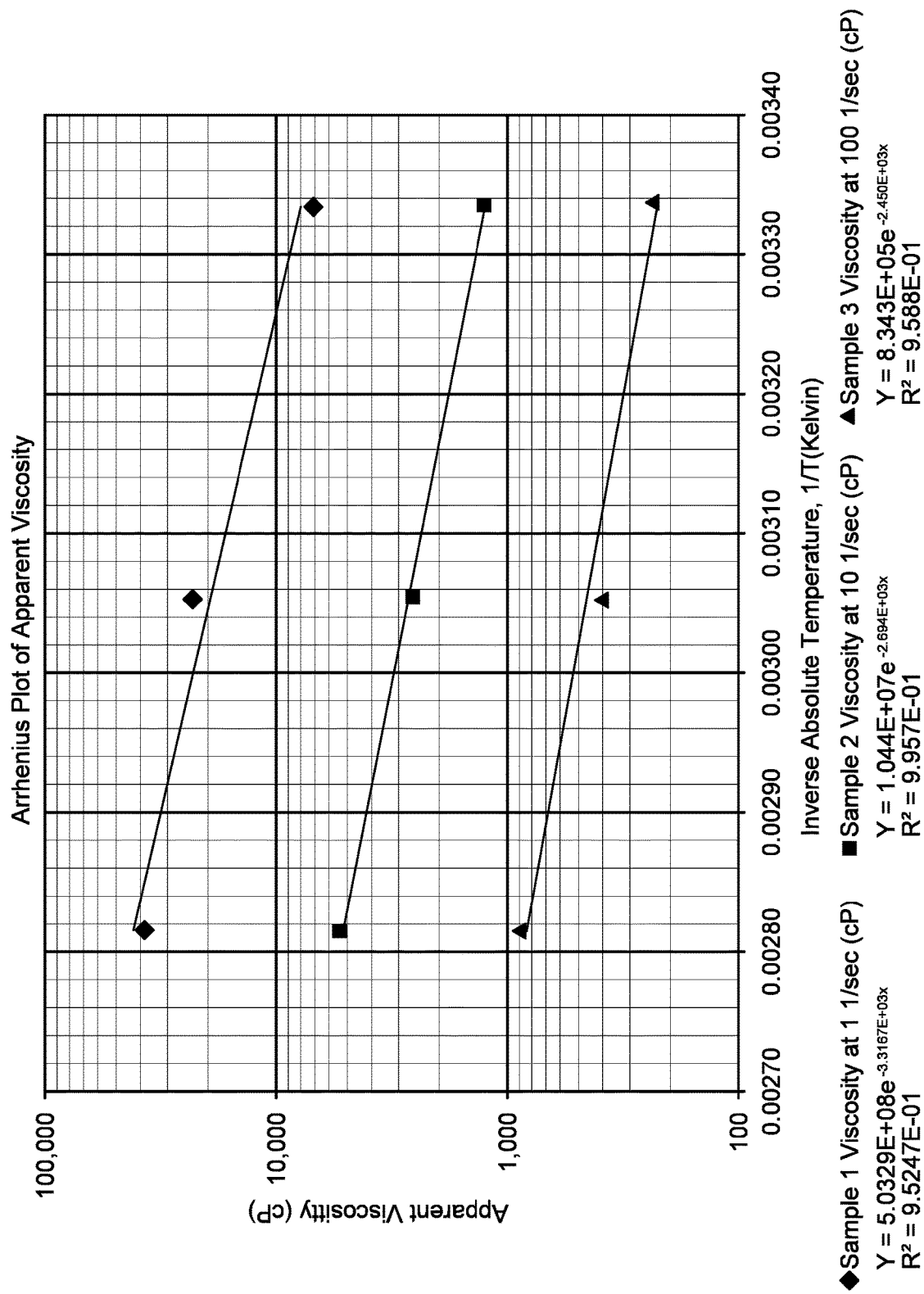
FIG. 5 is an Arrhenius plot of apparent viscosity for a fluid sample containing AZC.

The results from the rheology test are shown in Table 5. The results indicate that the spacer fluids containing the AZC have a relatively unchanged viscosity versus temperature relationship in the shear rate range from 10 to 100 1/sec. Furthermore, the spacer fluids from Table 4 show an Arrhenius thermal thickening behavior. FIG. 5 shows an Arrhenius plot of apparent viscosity for fluid sample 5 for the three calculated shear rates. The observed Arrhenius thermal thickening behavior of sample 5 may be explained by the relatively large amount of hydrated line and pozzolan (AZC) to water content. The thickening behavior may be manipulated by adding diluents such as water or inert materials as shown in sample 4.

Figure 6:
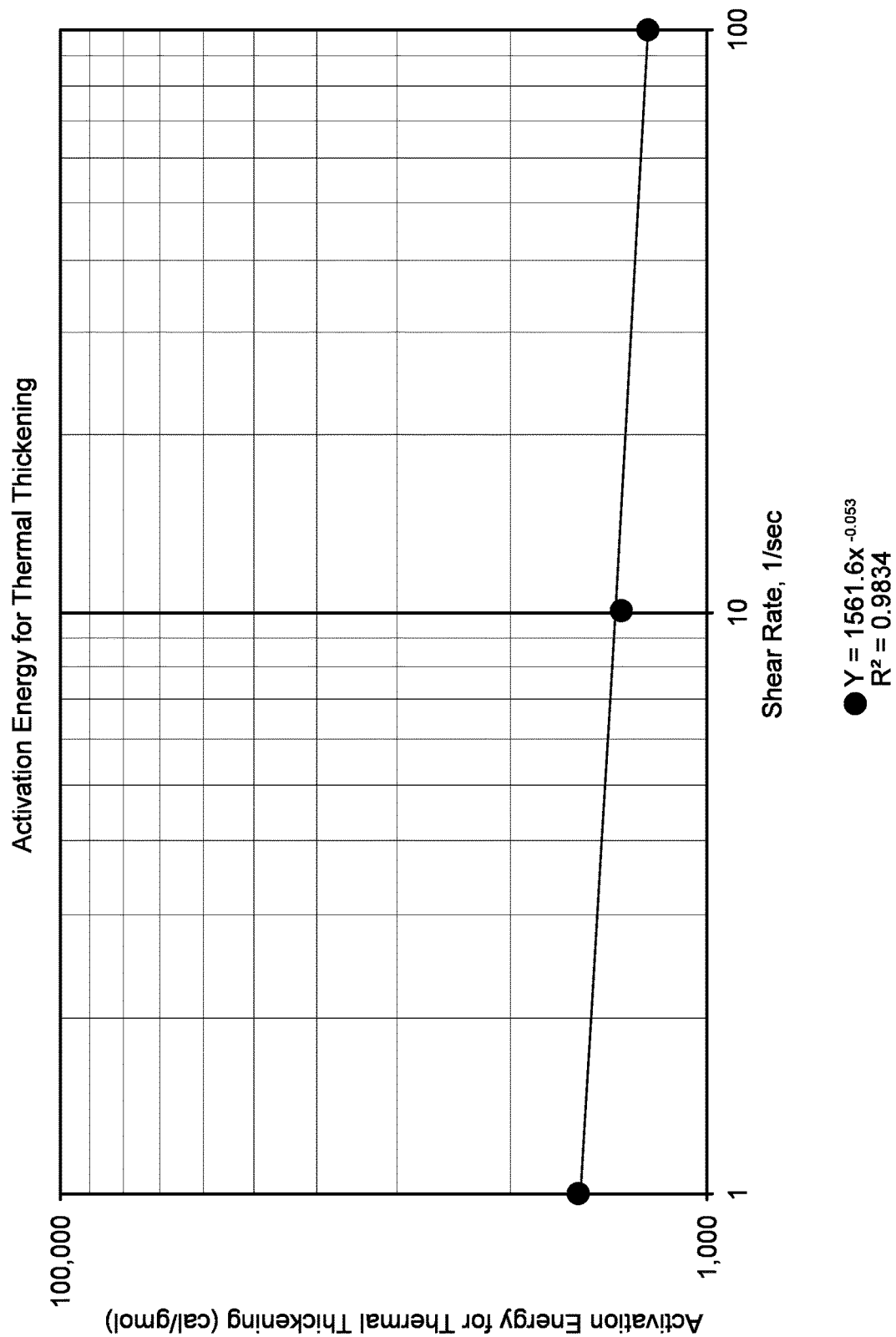
FIG. 6 is a graph of activation energy for thermal thickening for a fluid sample containing AZC.

Further, it can be observed from FIG. 6 that the activation energy for thermal thickening is relatively flat versus shear rate. FIG. 6 is a graph of activation energy for thermal thickening in cal/gmol versus shear rate at 1/sec. It can be observed that there is a weak effect between the shear rate on activation energy of thermal thickening.

After rheology testing, samples 4 and 5 were placed in an ultrasonic cement analyzer (UCA) and heated to 180° F. (82° C.). The results of the test are shown in Table 6. It was observed that compressive strength developed for each of the tested fluids.

TABLE 6

| Sample Fluid | T (° F.) | Time (hrs) | UCA C.S. (psi) |
|---|---|---|---|
| 4 | 180 | 48 | 37 |
| 5 | 180 | 72 | 108 |

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The examples disclosed above are illustrative only, as the present embodiments may be modified and practiced in different but equivalent manners apparent to those skilled in the art and having the benefit of the teachings herein. Although individual examples are discussed, the present disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method comprising:
    providing a spacer fluid comprising water and an agglomerated zeolite catalyst wherein the agglomerated zeolite catalyst comprises a matrix, a filler, a binder, and zeolite crystals; and
    displacing a drilling fluid in a wellbore using the spacer fluid.

2. The method of claim 1 wherein the spacer fluid further comprises hydrated lime.

3. The method of claim 2 further comprising allowing the spacer fluid to consolidate in an annular space in the wellbore.

4. The method of claim 1 wherein the agglomerated zeolite catalyst is a spent agglomerated zeolite catalyst.

5. The method of claim 1 wherein the zeolite crystals are selected from the group consisting of type x, type y, ultra-stable type y, ZSM-5, SAPO-11, silicalite-1, mordenite, ferrierite, beta, and combinations thereof.

6. The method of claim 1 wherein the agglomerated zeolite catalyst is present in an amount of about 1% to about 80% by weight of the spacer fluid.

7. A method comprising:
introducing a spacer fluid comprising agglomerated zeolite catalyst, hydrated lime, and water into a wellbore annulus such that the spacer fluid displaces a drilling fluid in the wellbore annulus, the agglomerated zeolite catalyst comprises a matrix, a filler, a binder, and zeolite crystals; and
introducing a cement composition into the wellbore annulus after the spacer fluid,
wherein at least a portion of the spacer fluid consolidates in the wellbore annulus to form a hardened mass.

8. The method of claim 7 wherein the agglomerated zeolite catalyst is a spent agglomerated zeolite catalyst.

9. The method of claim 7 wherein an agglomerated zeolite catalyst to hydrated lime weight ratio is about 1:3 to about 1:5, and wherein the spacer fluid is free of additional components that hydraulically set in the presence of water and hydrated lime.

10. The method of claim 7 wherein the zeolite crystals are selected from the group consisting of type x, type y, ultra-stable type y, ZSM-5, SAPO-11, silicalite-1, mordenite, ferrierite, beta, and combinations thereof.

11. The method of claim 7 wherein the cement composition comprises water and a hydraulic cement selected from the group consisting of Portland cements, pozzolana cements, gypsum cements, alumina based cements, silica cements, and combinations thereof.

12. A composition comprising:
an agglomerated zeolite catalyst, wherein the agglomerated zeolite catalyst comprises a matrix, a filler, a binder, and zeolite crystals;
hydrated lime; and
water.

13. The composition of claim 12 wherein the agglomerated zeolite catalyst is a spent agglomerated zeolite catalyst.

14. The composition of claim 12 wherein the zeolite crystals are selected from the group consisting of type x, type y, ultra-stable type y, ZSM-5, SAPO-11, silicalite-1, mordenite, ferrierite, beta, or combinations thereof.

15. The composition of claim 14 wherein the matrix is an amorphous solid comprising kaolin filler and silica sol binder, wherein the filler is a clay, and wherein the binder is an aluminate compound.

16. The composition of claim 12 wherein an agglomerated zeolite catalyst to lime weight ratio is about 1:3 to about 1:5.

17. The composition of claim 16 wherein the composition is free of additional components which hydraulically set in the presence of water and hydrated lime.

* * * * *